United States Patent Office 3,295,206
Patented Jan. 3, 1967

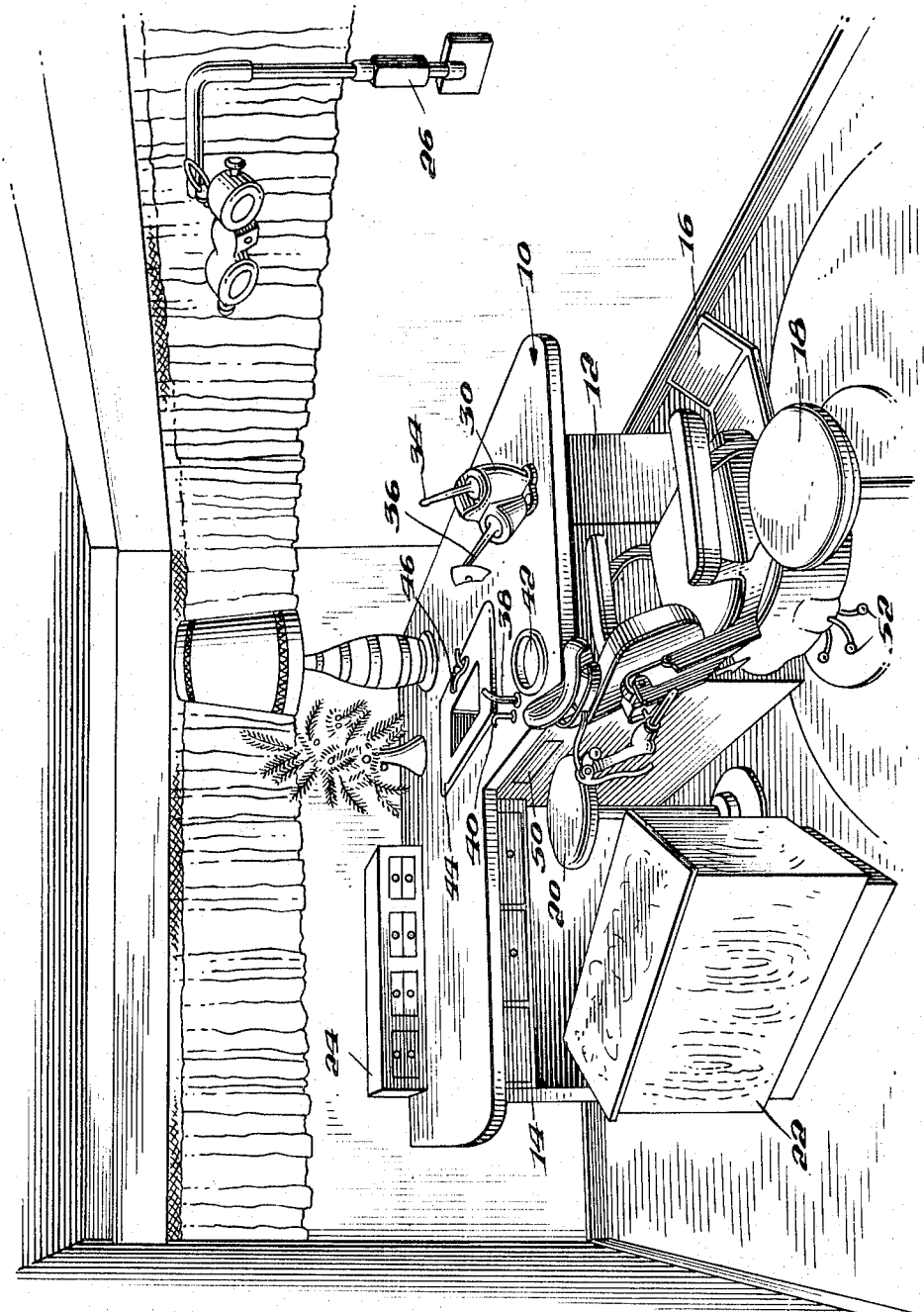

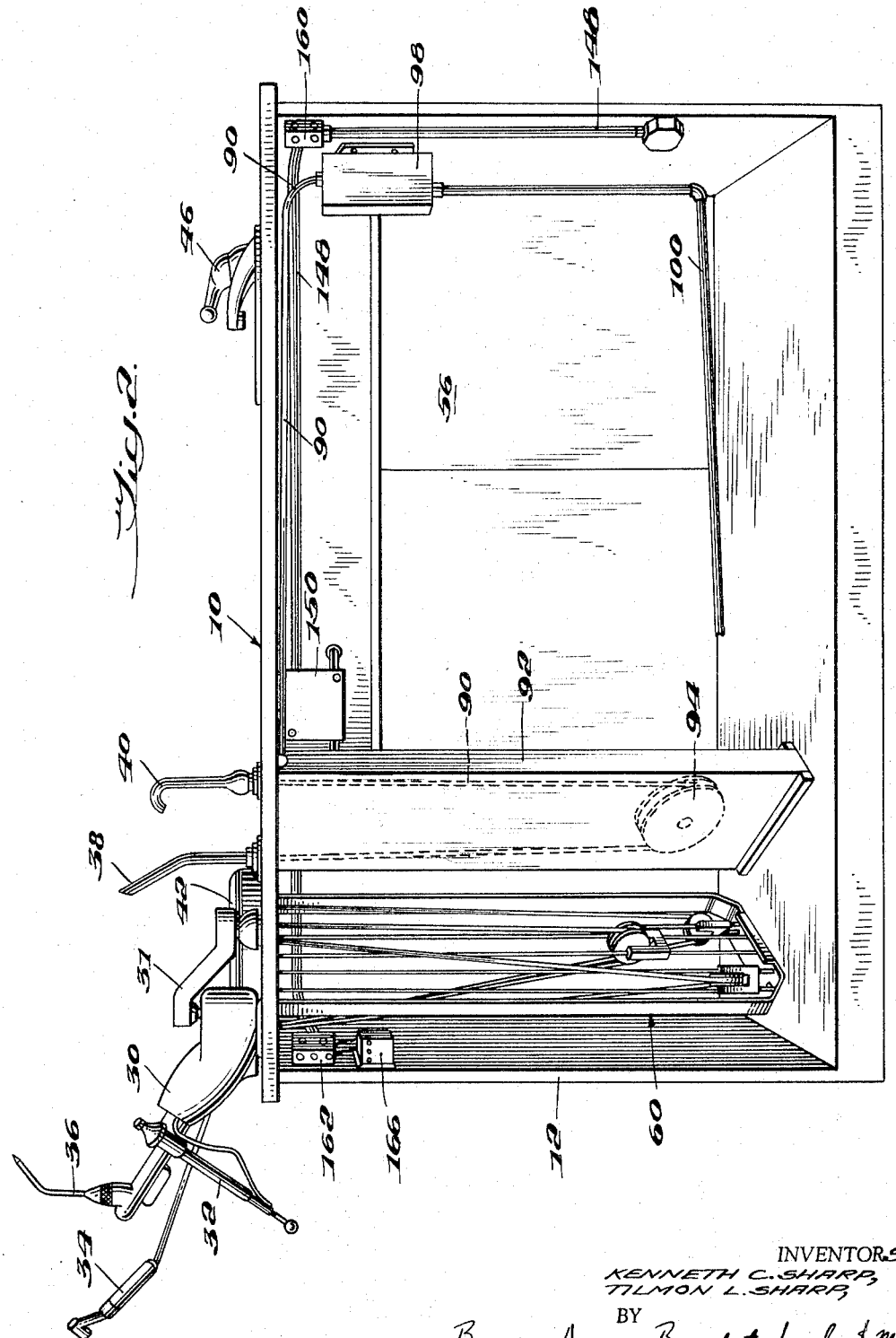

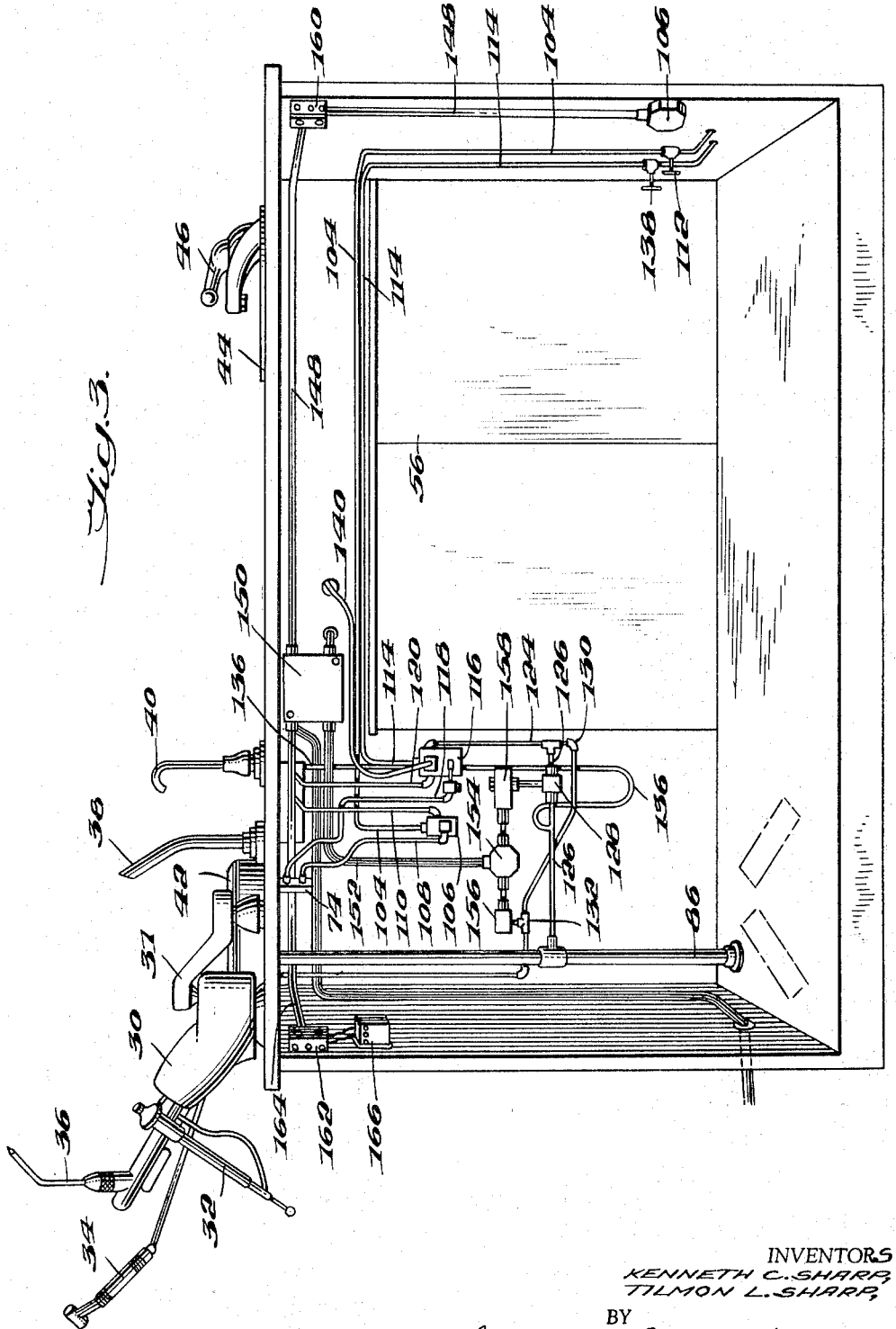

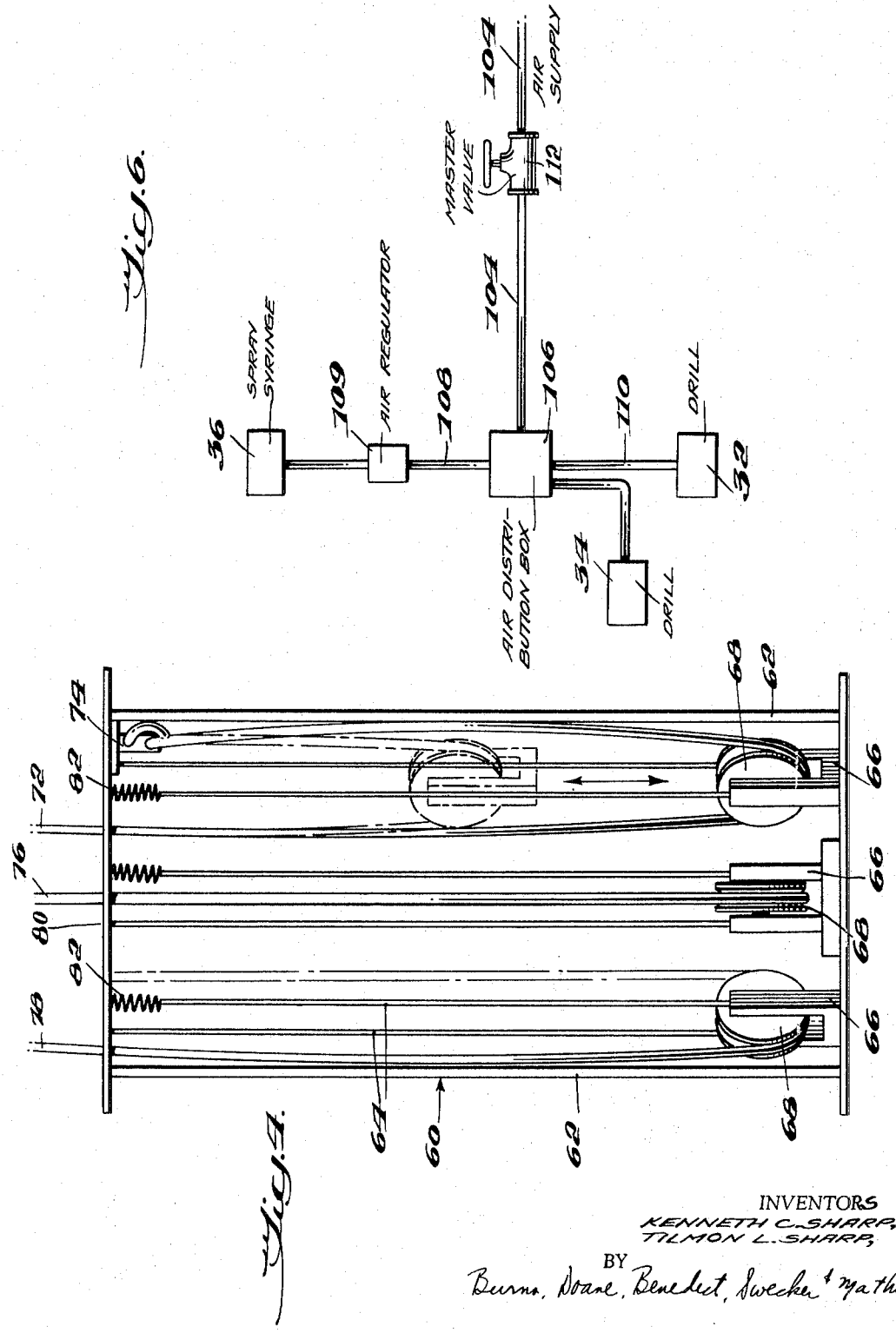

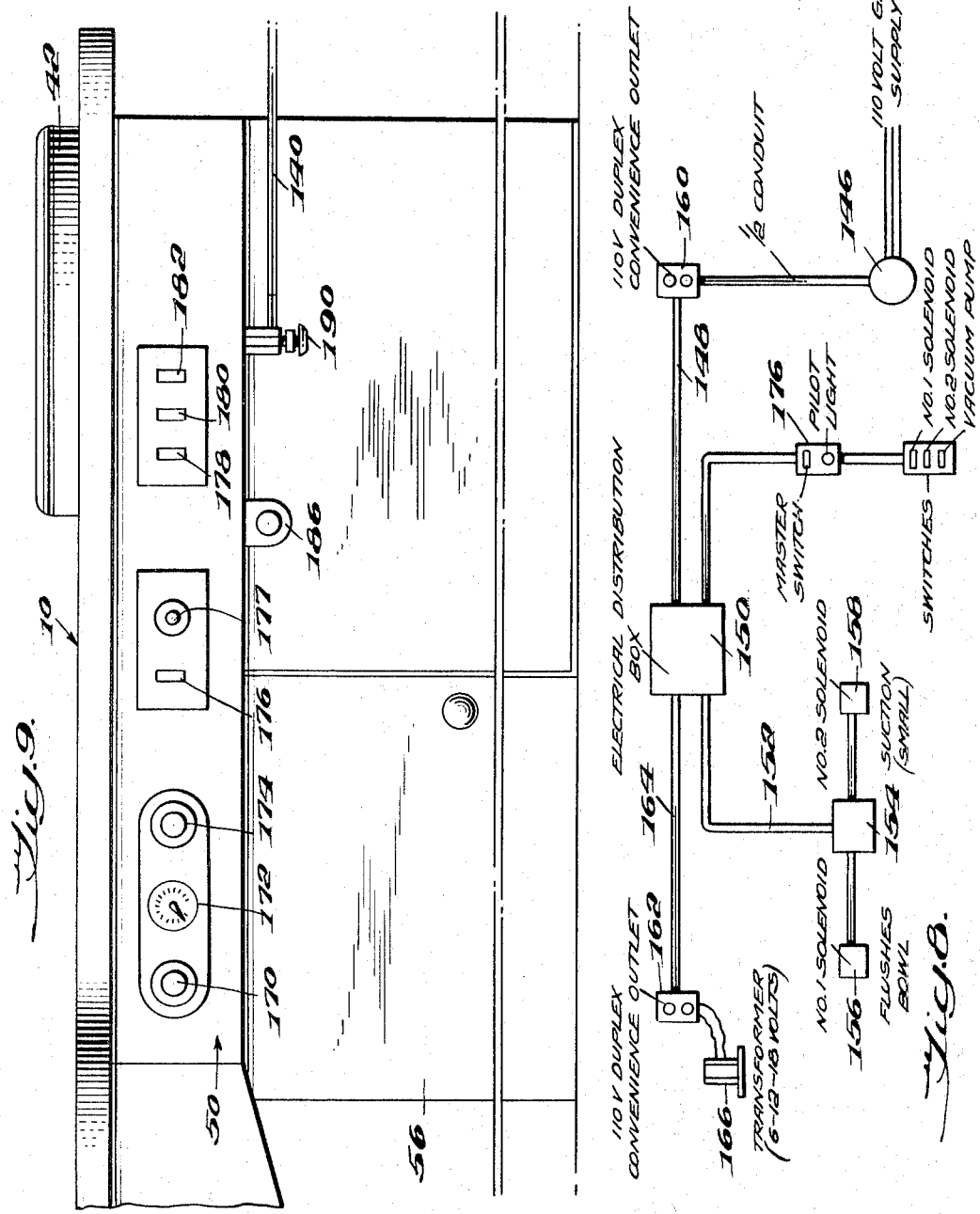

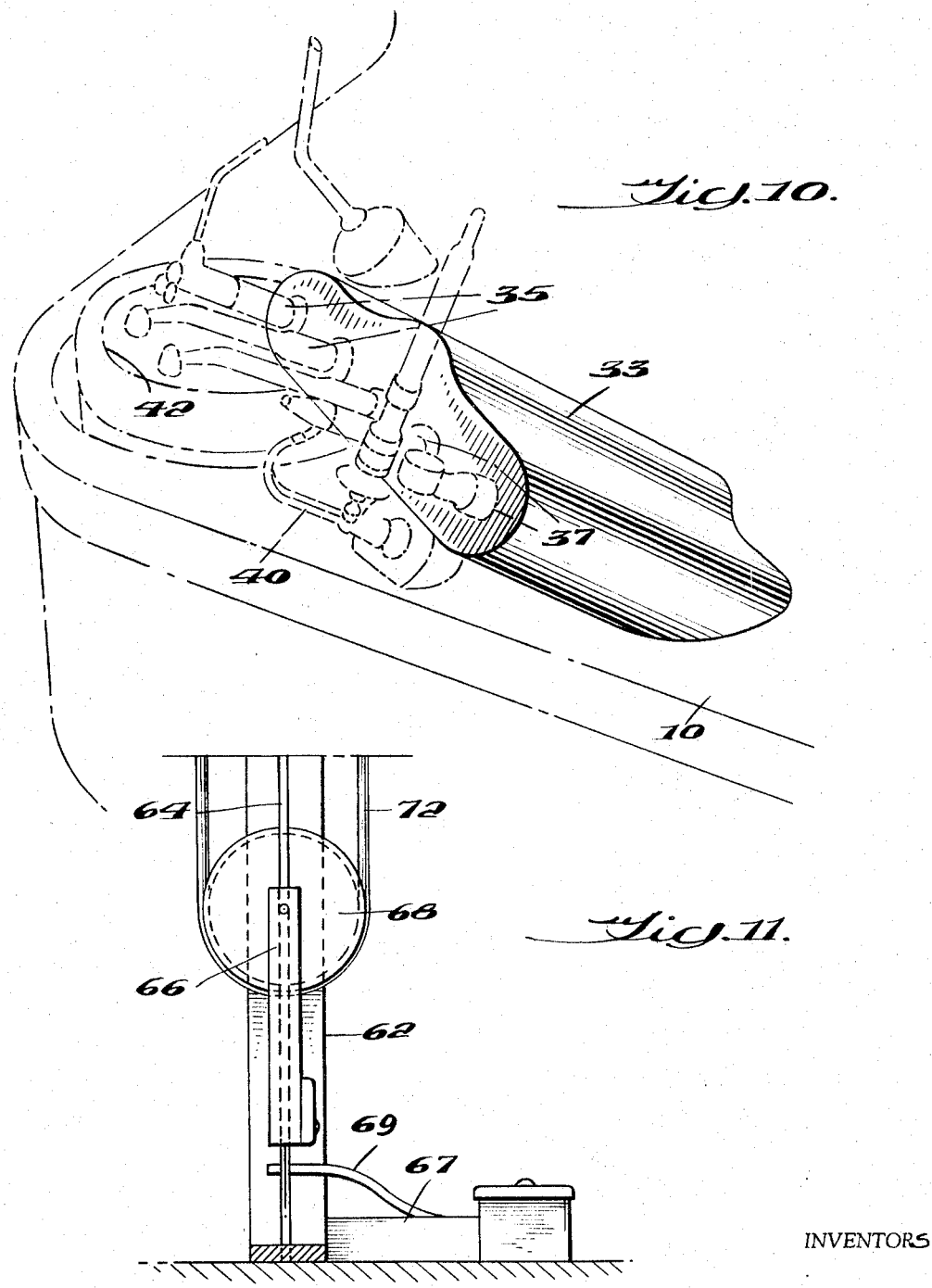

3,295,206
DENTAL EQUIPMENT
Tilmon L. Sharp and Kenneth C. Sharp, both of
609 S. Broadway, Knoxville, Tenn. 37902
Filed June 4, 1965, Ser. No. 467,808
6 Claims. (Cl. 32—22)

This application is a continuation-in-part of our prior application, Serial No. 275,032, filed April 23, 1963, now abandoned.

This invention relates to dental equipment. More specifically, the invention relates to a novel arrangement of equipment in a dentist's office, including a desk for supporting and housing the equipment and instruments that a dentist or a dental technician uses when treating a patient.

Studies have been made pertaining to the manner in which the equipment in a dentist's office might be arranged and the various techniques which might be employed by a dentist and his assistant in treating a patient. Such studies reveal the need for properly locating the dental instruments, dental supplies, medicines, etc., in such a manner that movement by the dentist and his assistant can be effected in an efficient speedy and non-tiring manner. The location where the dentist and his assistant stand in relation to the patient and to the dental instruments and the dental supplies is an extremely important factor to a dentist in treating a patient so as to avoid fatigue and to be able to effectively treat the patient. It is desirable that all of the dental supplies and the dental instruments be located in such a position that they may be easily reached by the dentist's assistant. Also, it is desirable that the dentist be positioned with respect to the patient and his assistant in such a manner that the dentist need not move his hands far from the patient's mouth. Furthermore, it is desirable that the dentist be in a position in relation to his assistant so that the assistant may hand materials and instruments to the dentist speedily and without obstruction.

A conventional type of equipment in a dentist's office consists of an upright, post-like dental stand on which are mounted the necessary drilling equipment, syringes and other instruments, as well as a cuspidor bowl and sometimes a small-sized tray. The conventional type of upright dental stand is not adapted to efficient dental techniques pertaining to the movement by the dentist and his assistant in handling the dental supplies and the instruments in relation to the patient.

In addition to the conventional dental stand, a dentist's office in the past customarily has been equipped with cabinets, tables, and possibly other equipment for housing the dental supplies and for providing a work area for the dentist's assistant. The conventional arrangement of such equipment in a dentist's office, out of necessity, has meant that the dentist and his assistant must make frequent trips back and forth between cabinets and tables and the location at which the dentist treats the patient.

In addition to the fact that conventional dental equipment, including the conventional stand, does not contribute to efficient dental procedure as far as movement of the dentist and his assistant are concerned, such conventional equipment is unattractive and has an adverse psychological effect on patients. A conventional dental stand has numerous instruments protruding therefrom, and conventional cabinets and tables frequently leave dental supplies and other equipment exposed. The calmness which a dentist would like to impose upon his patients cannot be obtained by conventional equipment. A dental stand and the usual dentist office creates an operating room effect which cannot help but create apprehension in patients.

One object of this invention is to provide an arrangement of equipment in a dentist's office which allows for an efficient and effective system of movements by the dentist and by his assistant in handling the dental supplies and the dental instruments for treating the patient.

Another object of this invention is to provide a novel dental equipment desk for supporting and housing the dental supplies and the dental instruments used by a dentist, which desk makes readily available the dental supplies and the instruments and eliminates unnecessary movement by the dentist and the dentist's assistant in treating a patient.

Another object of this invention is to provide a dental equipment desk which makes a dentist's office attractive, which is considerably less expensive than conventional dental equipment and which eliminates some of the conventional equipment previously used in a dentist's office.

These objects may be accomplished generally by a novel desk-like structure, preferably of L-shaped or T-shaped configuration. One end of the desk supports and houses the equipment necessary for a dentist to treat a patient. This end of the desk is located near the patient's chair. Another section of the desk accommodates the dentist's supplies, hand tools, medicines, and other equipment. The dentist's assistant may stand or sit inside the L portion of the desk within easy reach of the instruments and the equipment and yet be adjacent the patient. The dentist may stand or sit beside the patient with the patient between the dentist and the section of the desk containing the dental instruments.

The dental equipment desk has a flat top in which is mounted a cuspidor bowl at one corner near the patient and a sink near the middle of the desk or near the other end. A dental instrument holder is mounted on the desk top near the patient and holds the neecessary dental instruments, for example, the drills and syringes. Suitable drawers and shelves are built into the desk, and the desk is provided with sufficient flat counted space on which the assistant may work without need for getting up and moving about.

The apparatus necessary to operate the dental instruments is housed underneath the top of the desk out of sight yet conveniently accessible for servicing. Also, underneath the top of the desk there are the necessary water supply lines, electric supply lines, vacuum supply lines including a vacuum pump, and the necessary drain lines, all of which are out of sight of the patient. A switch panel for controlling the apparatus is on the front of the desk in convenient reach of the dentist's assistant. The desk top is sufficiently low so that the dentist's assistant may be seated at a swiveling stool.

A preferred embodiment and modifications of the invention relating to the arrangement of equipment in a dentist's office, as well as a dental equipment desk, are illustrated in the accompanying drawings in which:

FIG. 1 is a perspective view showing an arrangement of equipment in a dentist's office, including the dental equipment desk;

FIGS. 2 and 3 are similar perspecitve views showing the inside of one end of the dental equipment desk (for clarity, various apparatus has been omitted in the respective views);

FIG. 4 is an enlarged elevation view of a pulley assembly located within the dental equipment desk;

FIG. 6 is a diagrammatic view of an air system for the dental equipment desk;

FIG. 8 is a diagrammatic view of an electrical system for the dental equipment desk;

FIG. 9 is an elevation view of a front portion of the dental equipment desk showing a control panel;

FIG. 10 is a perspective view of a portion of the desk showing an instrument holder thereon; and FIG. 11 is a detail side elevation, partly in section, showing controls for the instruments.

Figure 7:
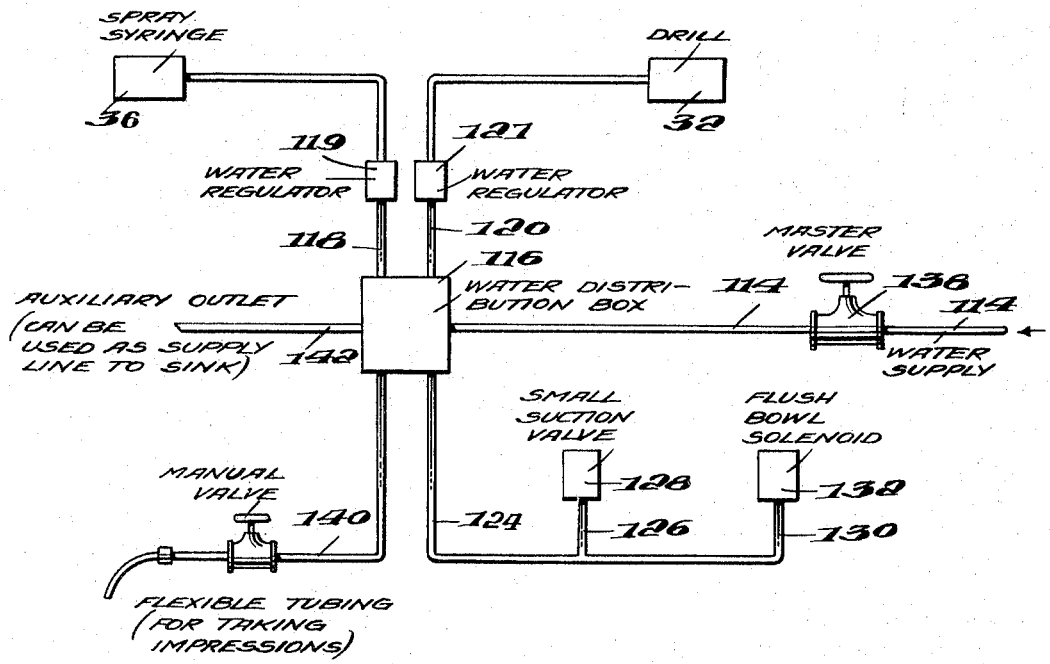
FIG. 7 is a diagrammatic view of a water system for the dental equipment desk.

In FIG. 1 there is illustrated a dentist's office with equipment and furnishings arranged in such a manner as to afford an efficient and non-fatiguing procedure which can be carried out by a dentist and a dentist's assistant in treating a patient. A dental equipment desk 10 of this invention may be of L-shaped configuration (as shown) or of T-shaped configuration, or of other suitable configuration. The equipment desk 10 has an equipment section 12 and a drawer and shelf or storage section 14 which together form the L-shape. The desk 10 has a flat top preferably at a height of between 30 and 34 inches from the floor, that is, generally at the same height as a conventional table top.

A patient's chair 16 is located adjacent the end of the equipment section 12 of the desk 10. The patient's chair 16 may be either the swiveling or nonswiveling type and of any suitable form. The chair 16 is placed close enough to the desk 10, and the height of the desk 10 and of the chair 16 are so proportioned that a patient, while seated in the chair, may easily lean his head over the end of the desk 10. Usually, the chair 16 has arms thereon. The top of the desk 10 is slightly higher than the arms of the chair 16, as illustrated in FIG. 1. The height relationship between the top of the desk 10 and the chair 16 may vary somewhat, but the top of the desk generally should be at the same height as the arms on the chair, or at the height where the arms would be if the chair had arms.

A swiveling stool 18 is located adjacent the right hand side of the chair 16 for use by the dentist. Preferably, the stool 18 is not fixed in place but is movable to suit the dentist. A similar swiveling stool 20 is located inside the L-section of the equipment desk 10 for use by the dentist's assistant. A separate stand or cabinet 22 may be provided as illustrated in FIG. 1 adjacent the assistant's chair 20, and an additional smaller size cabinet 24 may be located on the top of the equipment desk 10 for holding medicines, hand tools, and an amalgamator, for example. A lamp 26 is mounted on the wall in position to be directed toward the patient while seated in the chair 16. The lamp 26 may be suspended from the ceiling, if desired.

A swiveling dental instrument holder 30 for receiving powered dental instruments is mounted on the top of the equipment section 12 of the desk 10, within the confines thereof, near the chair 16 by a mounting member 31. For example, these instruments may be an air-driven straight hand piece 32 (drill), a high speed air turbine hand piece 34 (drill), and a syringe 36.

The instrument holder may be made of a rigid type, if desired, as indicated at 33 in FIG. 10. This holder 33 is secured rigidly on the top surface of the desk 10 by suitable fastening means. The instruments 35 are mounted in the holder 33 in side-by-side relation for individual selective use, being received in sockets 37 in the holder 33 with flexible supply lines extending downwardly therethrough and through the table.

A suction nozzle 38 and a saliva ejector 40 are mounted on the top of the equipment section 12 of the desk 10 to protrude upwardly therefrom adjacent a cuspidor bowl 42 which is built into the top of the desk 10, within the confines and at a corner thereof, near the patient's chair 16. A sink 44 with a faucet 46 is sunk into the top of the desk 10 near the middle thereof. The sink 44 may be mounted near the end of the section 14, if desired.

A control panel 50, by which the various apparatus to be described can be controlled, is mounted on an inside wall of the desk facing the assistant's chair 20. Foot pedals 52 which are manipulated by the dentist are located at the dentist's chair 18.

The arrangement of equipment illustrated in FIG. 1 allows the dentist and the dentist's assistant to treat a patient speedily and efficiently with a minimum amount of movement and with maximum convenience and comfort. The dentist, while seated on the stool 18 or while standing by the right side of the patient, is conveniently near the swiveling instrument holder 30 so that the assistant while standing or while seated on the stool 20 can hand to the dentist any one of the particular instruments 32, 34 or 36. The assistant, while seated may easily reach most any portion of the L-shaped desk 20 or may swing around to reach into the separate cabinet 22. The small cabinet 24 on the desk 10 is in position for convenient access by the assistant as are the drawers and shelves in section 14 of the desk 10.

This arrangement eliminates the need for the assistant to walk about, from various cabinets and cupboards, back and forth to the dentist as in conventional dental equipment arrangements. The dentist need only position himself near the patient when the assistant is located near the stool 20 and without need for either one of them to move about; the dentist and his assistant can hand instruments and materials back and forth. It is not necessary for the dentist to move his hands more than a few inches away from the patient's mouth. This arrangement of equipment, provided for specifically by the dental equipment desk 10, affords a very efficient operation and eliminates fatigue of the dentist and his assistant.

Furthermore, the apparatus necessary to service the dental equipment desk, and which is not yet explained, is hidden from view of the patient. The top of the desk 10 is sufficiently low and sufficiently large to provide ample working space for the assistant. The desk 10 eliminates the need for the conventional type of upright dental equipment stand which usually obstructs free movement about a dentist's office. The desk 10, in addition to its utilitarian function, is extremely attractive and greatly enhances the appearance and atmosphere of a dentist's office.

The spacing and relative positions of the equipment illustrated in FIG. 1 may be varied somewhat, but in general should be as follows. The dentist's swiveling stool 18, which may be movable, should be placed close enough to the chair 16 so that the dentist may sit on the stool or stand between the stool and the chair to treat a patient. The patient's chair 16 should be placed conveniently close to the equipment section 12 of the desk 10 so that the patient may lean over to the cuspidor bowl 42 and so that the instruments held by the instrument holder 30 may reach effectively the patient's mouth. There will be suitable space, however, between the chair 16 and the end of the equipment section 12 for a person to walk through.

The assistant's chair 20 should be inside the L formed by the equipment section 12 and the drawer and shelf section 14 of the desk 10, as shown in FIG. 1. The sections 12 and 14 should be proportioned so that the assistant, while seated on the stool 20, may have easy access to most parts of the desk and so that the assistant may reach the dental instrument holder 30 and hand the instruments to the dentist, while the dentist is located near the stool 18. When the assistant is helping the dentist, the assistant need not leave the area between the desk 10 and the cabinet 22. Ample flat working space for the assistant is provided by the top of the desk 10 and by the top of the cabinet 22.

The dental equipment desk 10 could be made into other configurations as well as the L-shaped configuration shown. For example, a U-shaped configuration could be used with the assistant positioned inside the U, or a T-shaped configuration could be used with the assistant in the same position explained with reference to the L-shaped configuration shown in FIG. 1. The remaining equipment otherwise should be positioned as illustrated in FIG. 1.

The inside of the equipment section 12 of the desk 10 is illustrated in FIGS. 2 and 3 as if viewed from right to left with respect to FIG. 1. A sliding door is provided for access to the inside of the equipment section 12. Housed within the equipment section 12 underneath the top of the desk 10 are the service lines and the apparatus necessary for servicing the instruments and other equipment which is mounted on the top of the desk 10. In both FIGS. 2 and 3, some of the equipment has been left out of the drawings for clarity.

A pulley assembly 60 (FIGS. 2 and 4) includes a frame structure 62 fixed to the inside of the desk 10. A group of vertically extending rods 64 (FIG. 4) extend through and guide pulley brackets 66 on which are journaled pulleys 68.

A flexible conduit or line 72 runs from the syringe instrument 36 and extends around one of the pulleys 68 to a connection 74. Water and air are supplied through separate tubes within the conduit 72 from the connection 74 so that the syringe 36 can dispense either water, air or a spray.

A flexible line or conduit 76 runs to the drill 32 and a similar flexible conduit 78 runs to another drill 34. The conduits 76 and 78 contain smaller tubes or cables which supply fluid or other power to operate the drills 32 and 34. Each of the conduits 76 and 78 extends around one of the pulleys 68 and runs to a connection 80.

The pulley brackets 66 can slide up and down the rods 64 so that the conduits 72, 76 and 78 may be extended when the respective instruments 32, 34 and 36 are pulled out of the holder 30. Springs 82, around one of the rods 64, serve as bumpers when the brackets 66 are pulled to their upward limit. The weight of the brackets 66 and pulleys 68 pulls the conduits 72, 76 and 78 downwardly when the instruments are returned to the holder 30.

The frame 62 may be provided, if desired, with limit switches 67 (FIG. 11) having feeler members 69 extending into the path of sliding movement of the brackets 66 on the rods 64 in the lower positions thereof. The switches 67 control the supply of power or fluid to the instruments so as to deactivate the same automatically when the lines are withdrawn to their lower limits and the instruments are returned to their holder.

Figure 5:
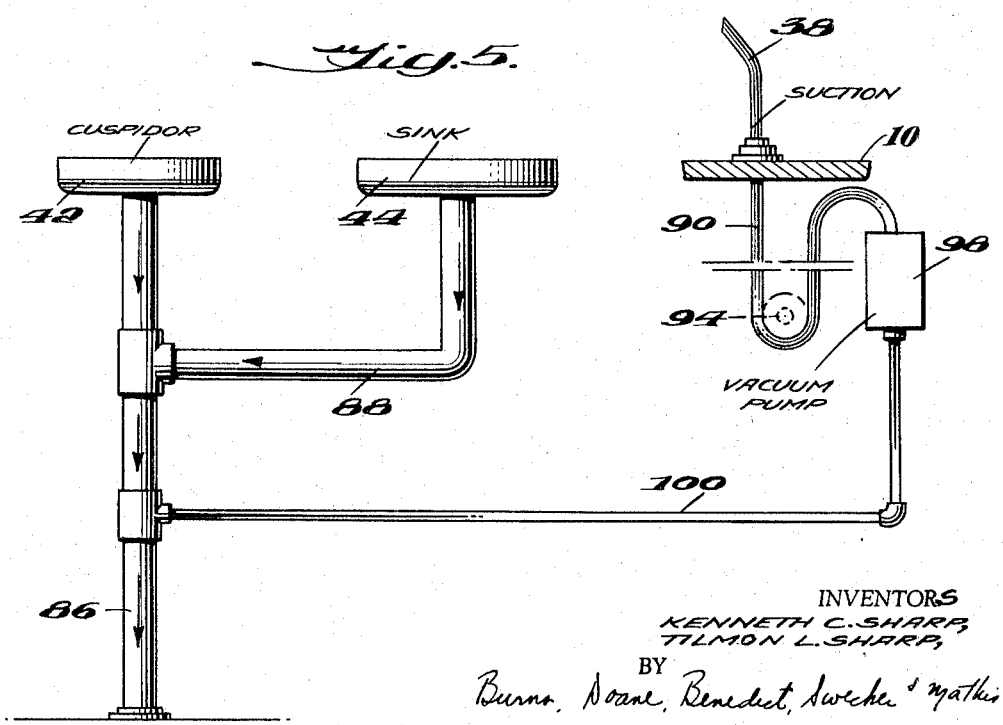
FIG. 5 is a diagrammatic view of a drain system and a vacuum system for the dental equipment desk.

In FIG. 5 there is shown a portion of the drain system for the desk 10. Main drain lines 86 and 88 run from the cuspidor bowl 42 and the sink 44. The suction mouthpiece 38 has connected thereto a flexible conduit 90 which extends into a housing 92 and around a movable pulley 94 therein (FIG. 2), which pulley slides up and down within the housing 92. The conduit 90 is connected to a vacuum pump 98 from which extends a small drain line 100 connected with the main drain line 86. Debris, fluid and particles picked up by the suction mouthpiece 38 pass through the conduit 90, the small drain line 100 and into the main drain line 86.

In FIG. 6 the air system for the desk 10 is shown diagrammatically. Compressed air is supplied from a source outside of the desk 10 through a line 104 to an air distribution box 106. From the distribution box 106 air is distributed through a line 108 to a regulator 109 and to the syringe 36. Also, air is distributed from the box 106 through lines 110 to the drills 32 and 34. A master valve 112 is located in the air supply line 104 to control the supply of air to the air distribution box 106.

In FIG. 7 the water supply system for the desk 10 is shown diagrammatically. Water is supplied to the desk 10 by a water supply line 114 leading to a water distribution box 116. From the box 116 water is distributed through a line 118 to a regulator 119 and then to the syringe 36. Also, water is distributed, if needed, through a line 120 to a regulator 121 and then to the drill 32. Water is distributed through a line 124 into a first line 126 containing a valve 128 and a second line 130 containing a valve 132. The line 126 runs to the main drain line 86 and the line 130 runs to the cuspidor bowl 42. When the valve 128 is opened, water rushing through the line 126 creates a small vacuum in a flexible conduit 136 (FIG. 3) which extends upwardly to the saliva ejector 40. A master valve 138 in the water supply line 114 controls the flow of water into the desk 10. Water is distributed from the box 116 through a line 140 to a point outside of the desk 10 to supply water for taking dental impressions or for other purposes. Another line 142 from the box 116 leads to the faucet 46 at the sink 44.

In FIG. 8 the electrical system for the desk 10 is shown diagrammatically. Electricity is supplied to the desk 10 at a box 146 to which is connected a line 148 leading to an electrical terminal box 150. A line 152 leads from the terminal box 150 to a junction box 154. A solenoid 156 for controlling the valve 132 is connected to the junction box 154, and a solenoid 158 for controlling the valve 128 is also connected with the junction box 154. A receptacle box 160 may be placed in the line 148 and another receptacle box 162 may be placed in a line 164 leading from the terminal box 150 to a transformer 166 which supplies low voltage current to a heating element in the syringe 36.

The control panel 50 on the desk 10 is illustrated in FIG. 9. Suitable lines as necessary may lead from the control panel 50 for controlling the various instruments and equipment. For example, a switch 170 is provided for controlling the amount of cooling water supplied to the drill 32. An air pressure gauge 172 and a control switch 174 for regulating the speed of the air turbine 34 are adjacent the switch 170. A master electric switch 176 is located next to a pilot light 177 which indicates the condition of the switch 176. Switches 178, 180 and 182 control, respectively, the solenoid 156 for flushing the cuspidor bowl 42, the solenoid 158 for controlling the suction in the saliva ejector 40, and the vacuum pump 98. A lever 186 controls the flow of air to and from the drills 32 and 34. A valve 190 is in the line 140 which leads from the water distribution box 116 to a point outside of the desk 10.

The stand or cabinet 22 has a flat top and may be constructed to hold several removable trays in a shelf-like fashion beneath the top. These trays may be made up at the beginning of the day for the individual patients who will be treated during that day. If, for example, the first patient will have an extraction, that patent's tray can be made up with the proper forceps, instruments and materials to take care of that operation. If the next patient will have filling, his tray can be made up for that particular operation, and so on.

The particular tray for each patent being treated by the dentist can be placed on top of the stand 22. Because of the particular arrangement of chair 16 and stand 22, the patient will have his back to the stand and will not be able to see the various instruments and materials on the tray. However, the dentist's assistant can easily reach the tray and hand the instruments and materials back and forth to the dentist.

The location of the apparatus inside the desk 10 can be varied somewhat. However, the instrument holder 30, and the cuspidor bowl 42 should be placed generally in the relative positions illustrated and described. The spacious interior of the equipment section 12 of the desk 10 provides for easy installation and maintenance of the equipment. The desk 10 can be manufactured relatively inexpensively and can be made of attractive wood materials, for example, without the need for using expensive metal forgings and castings as in the conventional upright dental stands.

Furthermore, the desk 10 can be custom built and outfitted with the exact equipment and instruments specified by a dentist. This is a highly desirable feature not usually obtainable with conventional upright dental stands. Moreover, after a desk has been constructed, the equipment and instruments can be replaced with new or different models.

While the invention has been illustrated and described in certain embodiments, it is recognized that other variations and changes may be made therein without departing from the invention as claimed.

We claim:
1. An equipment desk for a dentist's office, said desk comprising at least two sections fixed in L-shaped configuration, a flat top of L-shaped configuration for the desk generally at arm level with respect to a person seated at the desk, sides for the desk enclosing the space beneath the top, one end of one of the sections adapted to be located adjacent a patient's chair, a cuspidor bowl in the top of the desk at said one end adjacent the inside of the L-shaped portion, an instrument holder with extendable dental instruments mounted on the desk at said one end away from the inside of the L-shaped portion, extendable water and air lines for the dental instruments, means beneath said top and enclosed within the sides for retracting and holding said lines in a normally retracted position, a saliva ejector on the desk between the vertex of the L-shaped portion and the cuspidor bowl, and apparatus beneath the top and enclosed within the sides for servicing the bowl, the instruments and the saliva ejector.

2. In equipment for a dentist's office adapted for use with a patient's chair having arms, a dental equipment desk having two sections fixed in L-shaped configuration so that a dentist's assistant may be seated within the L-shaped portion and have access to both sections, a flat top of L-shaped configuration for the desk, sides for the desk enclosing the space beneath the top, one edge of the desk being located adjacent one of the arms of the chair, the top of the desk being generally at the same height as the arms, said chair facing away from the L-shaped portion, a cuspidor bowl mounted in the top of the desk near said one edge toward the inside of the L-shaped portion, an instrument holder with extendable dental instruments mounted on the top of the desk near said one edge away from the inside of the L-shaped portion, extendable water and air lines for the dental instruments, means beneath said top and enclosed within the sides for retracting and holding said lines in a normally retracted position, and apparatus for servicing said cuspidor bowl and instruments located beneath the top of the desk and enclosed within the sides.

3. In equipment for a dentist's office adapted for use with a patient's chair having arms, a dental equipment desk as defined in claim 7 further including a saliva ejector mounted on the desk between the vertex of the L-shaped portion and the cuspidor bowl, and an extendable vacuum normally beneath said top and enclosed within the sides.

4. An equipment desk for a dentist's office, said desk comprising a flat top including sections disposed in L-shaped configuration, sides for the desk enclosing the space beneath the top, one end of one of the sections adapted to be located adjacent a patient's chair, a cuspidor bowl in the top of the desk at said one end adjacent an edge at the inside of the L-shaped portion, an instrument holder with extendable dental instruments mounted on the desk adjacent the cuspidor bowl at said one end and spaced on the opposite side of the cuspidor bowl from said one edge, extendable water and air lines for the dental instruments, means beneath said top and enclosed within the sides for retracting and holding said lines in a normally retracted position, and apparatus beneath the top and enclosed within the sides for servicing the bowl and the instruments.

5. In a dentist equipment desk, a cabinet including a flat top having an edge adapted to be disposed beside a dentist chair, an elongated instrument holder above the flat top and having an end seated upon the flat top and fixed immovably on the top and extending laterally in an oblique position toward said edge, said holder having a plurality of seats in the outer end thereof, dental instruments mounted on the seats, and power lines connected with the instruments and extending lengthwise through the holder into the cabinet below the top in position to be withdrawn substantially in straight lines from within the cabinet and through said holder.

6. An equipment desk for a dentist's office, comprising a flat top, sides for the desk enclosing the space beneath the top, one end adapted to be located adjacent a patient's chair, a cuspidor bowl in the top of the desk at said one end adjacent one lateral edge of the flat top, an instrument holder with extendable dental instruments mounted on the desk at said one end adjacent the cuspidor bowl and spaced on the opposite side thereof from said lateral edge, extendable water and air lines for the dental instruments, means beneath said top and enclosed within the sides for retracting and holding said lines in a normally retracted position, and apparatus beneath the top and enclosed within the sides for servicing the bowl and the instruments.

References Cited by the Examiner

UNITED STATES PATENTS

| | | | |
|---|---|---|---|
| 478,830 | 7/1892 | Wenman | 128—172 |
| 2,308,812 | 1/1943 | Jankelson | 32—22 |
| 2,328,924 | 9/1943 | Ruf | 32—22 |
| 2,424,729 | 7/1947 | Andreasen | 32—22 |
| 3,085,338 | 4/1963 | Patzold | 32—32 |
| 3,111,759 | 11/1963 | Shackelford | 32—22 |
| 3,129,033 | 4/1964 | Emmerson | 32—22 X |

FOREIGN PATENTS

| | | |
|---|---|---|
| 960,760 | 3/1957 | Germany. |
| 1,035,317 | 7/1958 | Germany. |
| 806,363 | 12/1958 | Great Britain. |
| 894,024 | 4/1962 | Great Britain. |
| 568,957 | 11/1957 | Italy. |

CLAUDE A. LE ROY, *Primary Examiner.*

CHANCELLOR E. HARRIS, *Examiner.*